US011676326B2

(12) United States Patent
Akenine-Moller et al.

(10) Patent No.: US 11,676,326 B2
(45) Date of Patent: Jun. 13, 2023

(54) TECHNIQUES FOR ANISOTROPIC TEXTURE FILTERING USING RAY CONES

(71) Applicant: NVIDIA CORPORATION, Santa Clara, CA (US)

(72) Inventors: Tomas Akenine-Moller, Lund (SE); Jakub Boksansky, Munich (DE)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/145,016

(22) Filed: Jan. 8, 2021

(65) Prior Publication Data
US 2021/0350608 A1 Nov. 11, 2021

Related U.S. Application Data

(60) Provisional application No. 63/030,162, filed on May 26, 2020, provisional application No. 63/022,033, filed on May 8, 2020.

(51) Int. Cl.
| | |
|---|---|
| *G06T 15/06* | (2011.01) |
| *G06T 15/04* | (2011.01) |
| *G06T 15/00* | (2011.01) |
| *G06T 1/20* | (2006.01) |
| *G06T 3/40* | (2006.01) |
| *G06T 15/10* | (2011.01) |

(52) U.S. Cl.
CPC .............. *G06T 15/06* (2013.01); *G06T 1/20* (2013.01); *G06T 3/40* (2013.01); *G06T 15/005* (2013.01); *G06T 15/04* (2013.01); *G06T 15/10* (2013.01)

(58) Field of Classification Search
CPC .. G06T 15/06; G06T 1/20; G06T 3/40; G06T 15/04; G06T 15/10; G06T 15/005; G06T 2210/36
See application file for complete search history.

(56) References Cited

U.S. PATENT DOCUMENTS

| | | | | |
|---|---|---|---|---|
| 2009/0033661 | A1* | 2/2009 | Miller | G06T 15/60 345/426 |
| 2011/0248997 | A1* | 10/2011 | Munkberg | G06T 17/20 345/423 |
| 2012/0075303 | A1* | 3/2012 | Johnsson | H04N 13/275 345/421 |
| 2013/0328875 | A1* | 12/2013 | Burley | G06T 15/06 345/426 |
| 2014/0375659 | A1* | 12/2014 | McGuire | G06T 15/80 345/520 |

(Continued)

OTHER PUBLICATIONS

Arvo et al; "Fast Ray Tracing by Ray Classification"; ACM Computer Graphics, vol. 21, No. 4; Jul. 1987 (Year: 1987).*

(Continued)

*Primary Examiner* — Jeffery A Brier
(74) *Attorney, Agent, or Firm* — Artegis Law Group, LLP

(57) ABSTRACT

One embodiment of a method for computing a texture color includes tracing a ray cone through a graphics scene, determining at least one axis of an ellipse formed by the ray cone intersecting a plane associated with geometry within the graphics scene at a hit point, computing one or more gradients along the at least one axis of the ellipse, and computing a texture color based on the one or more gradients and a texture.

23 Claims, 10 Drawing Sheets

(56) References Cited

U.S. PATENT DOCUMENTS

| | | | | |
|---|---|---|---|---|
| 2016/0148415 A1* | 5/2016 | Yu | ............................ | G06T 15/06 |
| | | | | 345/422 |
| 2017/0206700 A1* | 7/2017 | Munkberg | ............ | G06T 15/005 |
| 2017/0323471 A1* | 11/2017 | Chien | .................... | G06T 19/006 |
| 2017/0323474 A1* | 11/2017 | Chien | .................... | G06T 15/506 |
| 2018/0197323 A1* | 7/2018 | Howson | .................. | G06T 17/10 |
| 2021/0090337 A1* | 3/2021 | Ravasz | ............... | G06F 3/04845 |

OTHER PUBLICATIONS

Max; "Cone-Spheres"; ACM Computer Graphics, vol. 24, No. 4; Aug. 1990 (Year: 1990).*

Hart; "Sphere tracing: a geometric method for the antialiased ray tracing of implicit surfaces"; The Visual Computer; Springer-Verlag; 1996 (Year: 1996).*

Hermanns et al; "Screen Space Cone Tracing for Glossy Reflections"; Springer International Publishing Switzerland; 2016 (Year: 2016).*

Han et al; "Ray Tracing Generalized Tube Primitives Method and Applications"; Eurographics Conference on Visualization; vol. 38, No. 3; 2019 (Year: 2019).*

Schilling et al., "Texram: A Smart Memory for Texturing", IEEE Computer Graphics and Applications, vol. 16, No. 3, May 1996, pp. 32-41.

Akenine-Möller et al., "Texture Level-of-Detail Strategies for Real-Time Ray Tracing", In Ray Tracing Gems, Haines E., Akenine-Möller T., (Eds.). 2019, ch. 20, pp. 321-345.

Ström et al., "Immersive Linear Algebra", 1.1 ed. 2020, Retrieved from http://immersivemath.com/ila/index.html, on Jun. 17, 2022, 2 pages.

* cited by examiner

TECHNIQUES FOR ANISOTROPIC TEXTURE FILTERING USING RAY CONES

CROSS-REFERENCE TO RELATED APPLICATIONS

This application claims the priority benefit of United States provisional patent application titled "Texture Filtering Techniques for Ray Tracing," filed on May 26, 2020, and having Ser. No. 63/030,162, which claims benefit of provisional patent application titled "Texture Filtering Techniques for Ray Tracing," filed on May 8, 2020, and having Ser. No. 63/022,033. The subject matter of these related applications is hereby incorporated herein by reference.

BACKGROUND

Technical Field

Embodiments of the present disclosure relate generally to computer science and computer graphics and, more specifically, to techniques for anisotropic texture filtering using ray cones.

Description of the Related Art

In three-dimensional (3D) computer graphics, ray tracing is a popular technique for rendering images, such as the frames of a movie or video game. Ray tracing techniques trace the path of light rays and simulate the effects of the light rays interacting with virtual objects within a virtual scene. Ray cone tracing techniques are similar to ray tracing techniques, except ray cone tracing techniques trace cones through a scene. Ray cone tracing techniques can solve various sampling and aliasing problems that affect ray tracing techniques. In addition, ray cone tracing techniques are less computationally expensive than some other ray tracing techniques, such as differential ray tracing and covariance tracing.

Anisotropic filtering is a technique that can be implemented to enhance the quality of certain surfaces that are rendered using texture mapping techniques, where the surfaces at-issue are at oblique viewing angles with respect to a virtual camera. As a general matter, images that are rendered using anisotropic filtering have fewer aliasing effects, reduced blur, and greater detail at extreme viewing angles than images that are rendered without using anisotropic filtering.

Currently, there are no ray cone tracing techniques that implement anisotropic filtering. As a result, images rendering using ray cone tracing oftentimes include aliasing effects, blurriness, and reduced detail, particularly at extreme viewing angles.

As the foregoing illustrates, what is needed in the art are more effective techniques for rendering graphics scenes using ray cone tracing.

SUMMARY

One embodiment of the present disclosure sets forth a computer-implemented method for rendering one or more images. The method includes tracing one or more ray cones through a graphics scene. The method further includes performing one or more anisotropic texture filtering operations based on the one or more ray cones to compute texture colors. In addition, the method includes rendering one or more graphics images based on the texture colors.

Another embodiment of the present disclosure sets forth a computer-implemented method for computing a texture color. The method includes tracing a ray cone through a graphics scene. The method also includes determining at least one axis of an ellipse formed by the ray cone intersecting a plane associated with geometry within the graphics scene at a hit point. The method further includes computing one or more gradients along the at least one axis of the ellipse. In addition, the method includes computing a texture color based on the one or more gradients and a texture.

Other embodiments of the present disclosure include, without limitation, one or more computer-readable media including instructions for performing one or more aspects of the disclosed techniques as well as one or more computing systems for performing one or more aspects of the disclosed techniques.

At least one technological advantage of the disclosed techniques relative to the prior art is that the disclosed techniques implement anisotropic filtering using ray cone tracing, thereby producing images that include fewer aliasing effects, less blurriness, and more detail at extreme angles relative to images rendered using conventional ray cone tracing. In addition, the disclosed techniques use ray cone tracing, which is less computationally expensive than some other ray tracing techniques, such as differential ray tracing, that can be used to implement anisotropic filtering. These technological advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
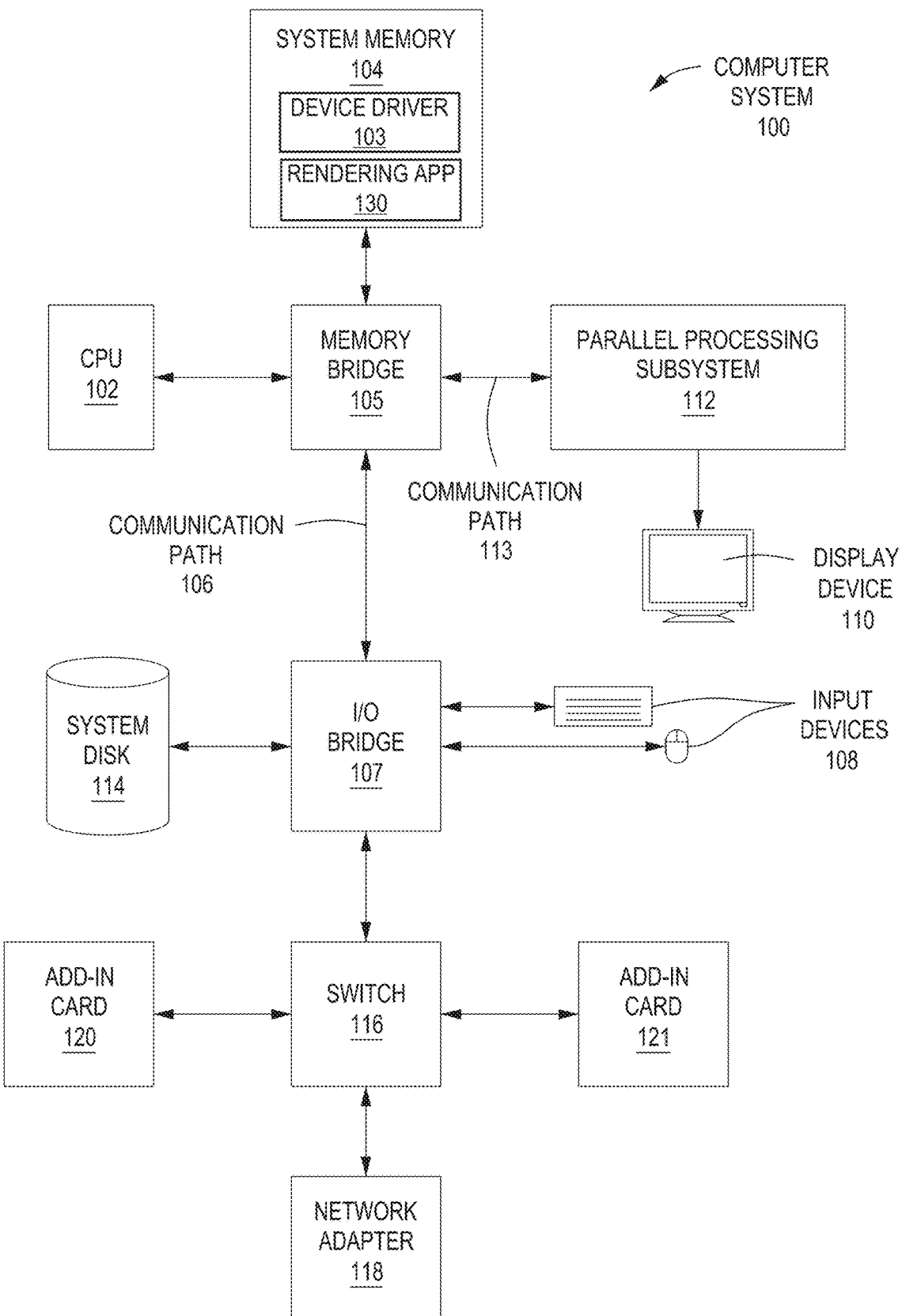
FIG. 1 is a block diagram illustrating a computer system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved ray cone tracing techniques that implement anisotropic filtering. The improved ray cone tracing techniques have many real-world applications, including video games, film production rendering, architectural and design applications, and any other applications in which images can be rendered using ray cone tracing. In the improved ray cone tracing techniques, when a ray cone being traced through a virtual three-dimensional (3D) scene hits a surface of geometry within the scene, the ray cone is approximated as a cylinder to determine the axes of an ellipse formed by the intersection of the ray cone and a plane associated with the surface. Texture coordinate gradients along the axes of the ellipse are then computed and input, along with a texture associated with the surface, into the texture unit of a graphics processing unit (GPU) that performs anisotropic texture filtering. The texture unit outputs an anisotropic filtered texture color that can then be used to determine the color of a pixel in a rendered image.

The ray cone tracing techniques of the present disclosure have many real-world applications. For example, the ray cone tracing techniques can be used to efficiently render images and/or frames within a video game. As a particular example, the ray cone tracing techniques could be performed by a cloud-based graphics processing platform, such as a cloud-based gaming platform, that executes video games and streams videos of game sessions to client devices. The disclosed ray cone tracing techniques are more computationally efficient than differential ray tracing techniques that implement anisotropic filtering. The rendered images and/or frames may also appear more lifelike than images and/or frames rendered using some other rendering techniques, such as conventional ray cone tracing techniques and rasterization-based techniques.

As another example, the ray cone tracing techniques can be used in the production-quality rendering of films. The production of animated films as well computer-generated imagery (CGI) and special effects within live action films, often requires high-quality rendering of frames of those films. The disclosed ray cone tracing techniques can be used to render the frames of a film more efficiently and/or correctly than some other techniques, such as differential ray tracing techniques and conventional ray cone tracing techniques.

As yet another example, the disclosed ray cone tracing techniques can be used to render the designs of architectural structures and other objects. Architectural and design applications oftentimes provide renderings to show how particular designs would look in real life. The disclosed ray cone tracing techniques can be used to more efficiently and/or correctly render images of designs than some other techniques, such as differential ray tracing techniques and conventional ray cone tracing techniques.

The above examples are not in any way intended to be limiting. As persons skilled in the art will appreciate, as a general matter, the ray cone tracing techniques described herein can be implemented in any application where convention ray tracing and/or ray cone tracing techniques are currently employed.

System Overview

FIG. 1 is a block diagram illustrating a computer system 100 configured to implement one or more aspects of the present embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes using ray cone tracing techniques disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
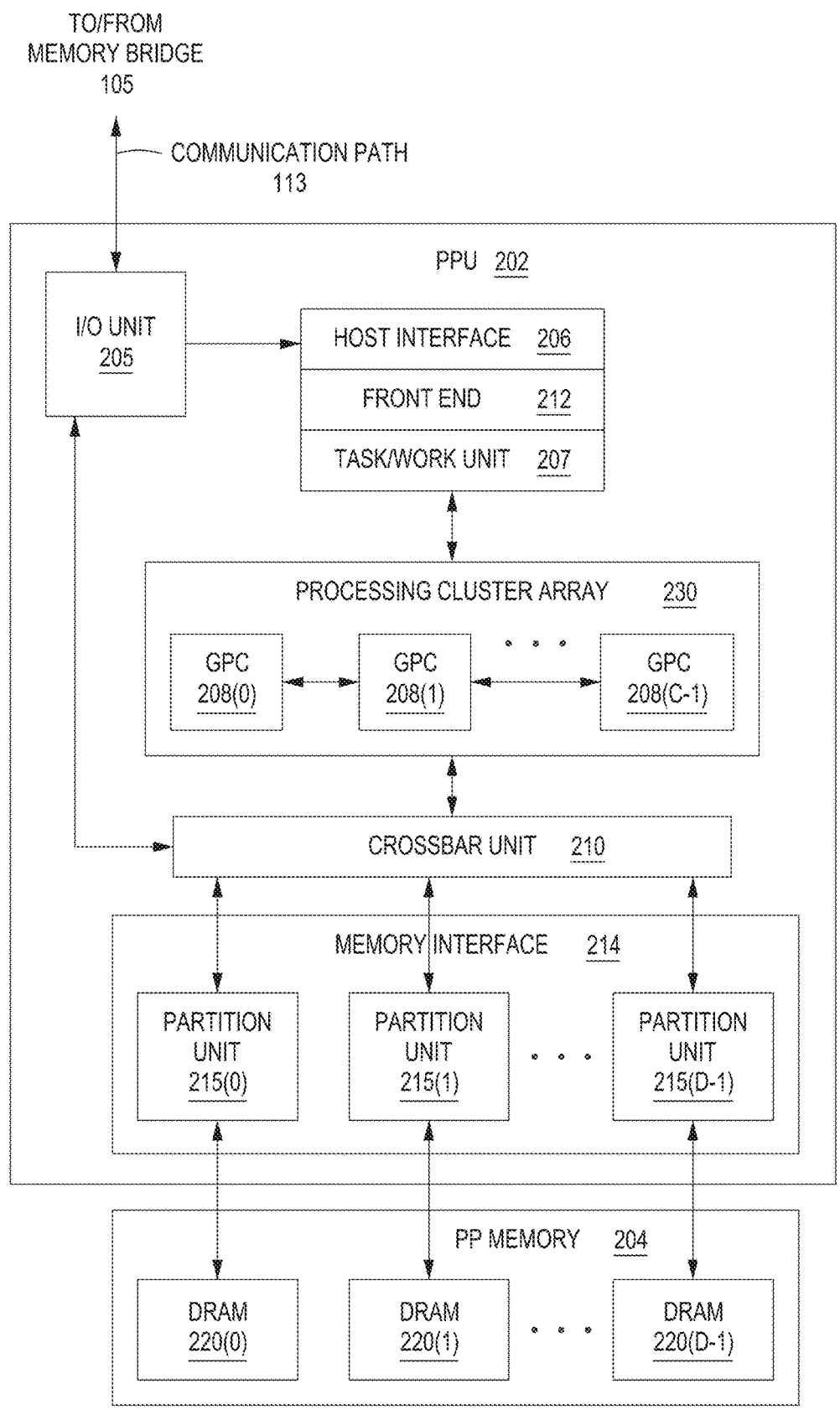
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
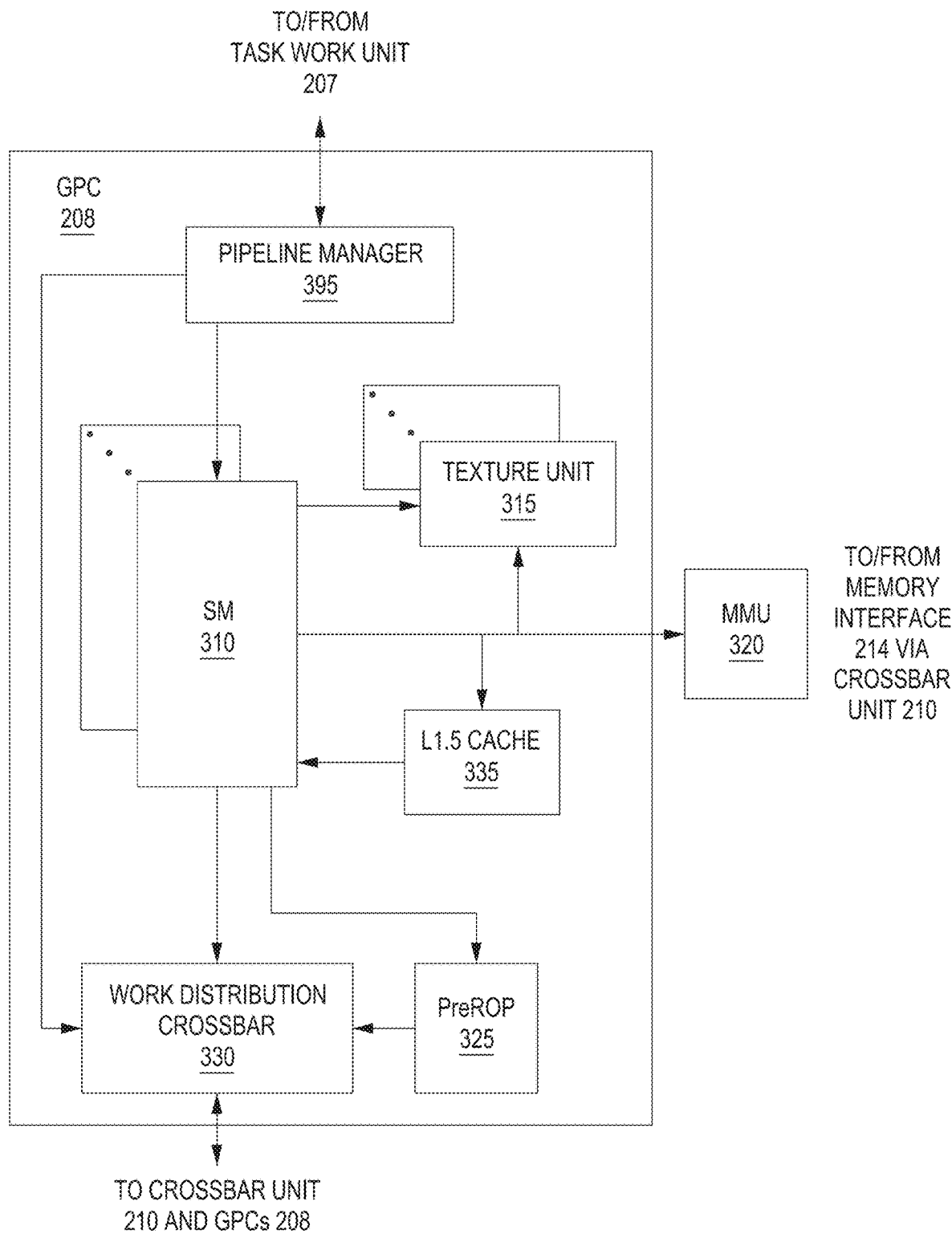
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
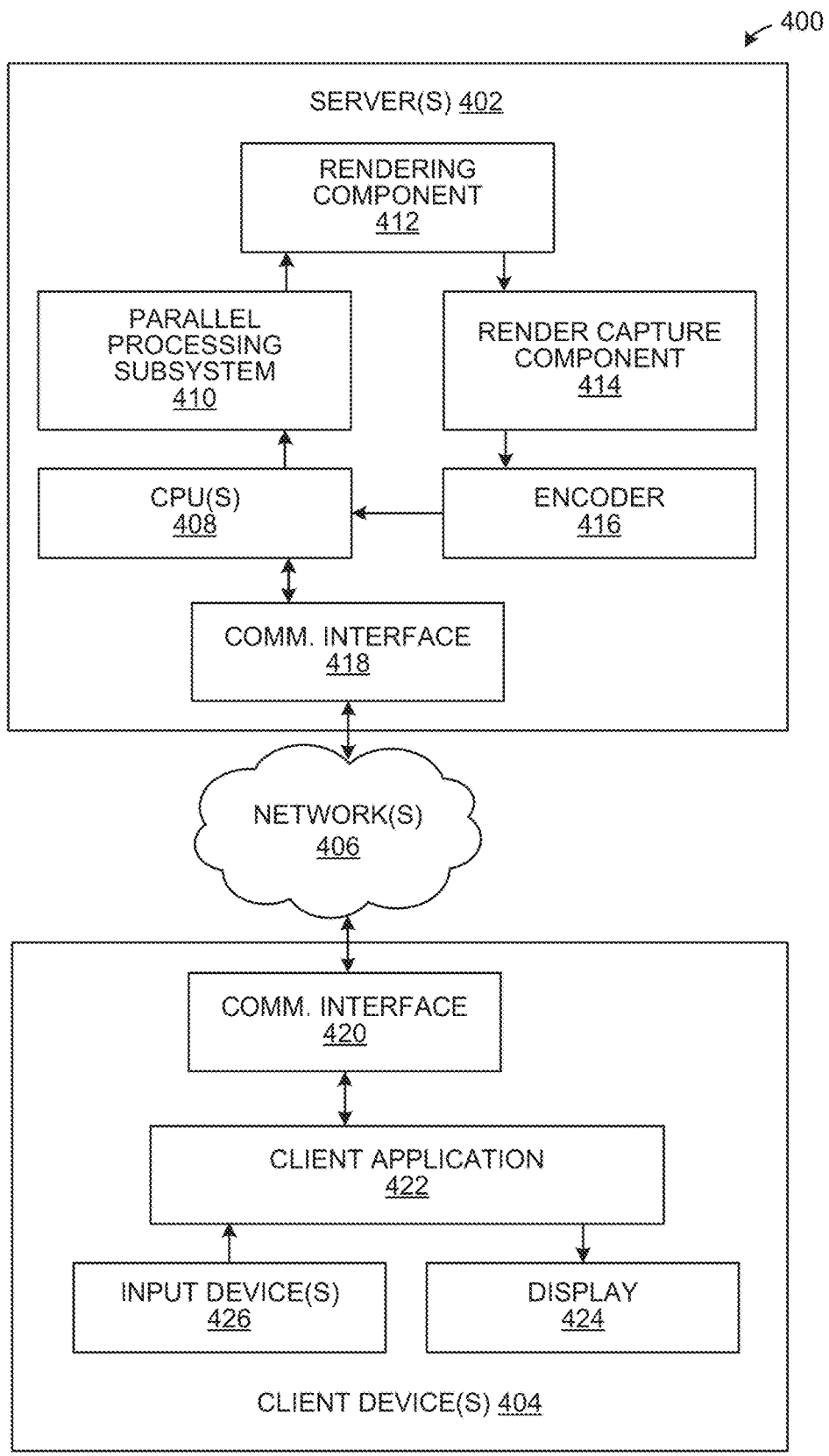
FIG. 4 is a block diagram illustrating an exemplary cloud computing system, according to various embodiments.

FIG. 4 is a block diagram illustrating an exemplary cloud computing system, according to various embodiments. As shown, a computing system 400 includes server(s) 402 that are in communication with client device(s) 404 via network(s) 406. Each of the server(s) 402 may include similar components, features, and/or functionality as the exemplary computer system 100, described above in conjunction with FIG. 1-3. Each of the server(s) 402 may be any technically feasible type of computer system, including, without limitation, a server machine or a server platform. Each of the client devices(s) 402 may also include similar components, features, and/or functionality as the computer system 100, except each client device 402 executes a client application 422 rather than the rendering application 130. Each of the client device(s) 402 may be any technically feasible type of computer system including, without limitation, a desktop machine, a laptop machine, a hand-held/mobile device, and/or a wearable device. In some embodiments, one or more of the server(s) 402 and/or the client device(s) 404 may be replaced with virtualized processing environment(s), such as virtualized processing environment(s) provided by one or more VMs and/or containers that execute on underlying hardware system(s). The network(s) 406 may include any type of network(s), such as one or more local area networks (LANs) and/or wide area networks (WANs) (e.g., the Internet).

In some embodiments, the server(s) 400 may be included in a cloud computing system, such a public cloud, a private cloud, or a hybrid cloud, and/or in a distributed system. For example, the server(s) 400 could implement a cloud-based gaming platform that provides a game streaming service, also sometimes referred to as "cloud gaming," "gaming on demand," or "gaming-as-a-service." In such a case, games that are stored and executed on the server(s) 400 are streamed as videos to the client device(s) 402 via client application(s) 422 running thereon. During game sessions, the client application(s) 422 handle user inputs and transmit those inputs to the server(s) 400 for in-game execution. Although cloud-based gaming platforms are described herein as a reference example, persons skilled in the art will appreciate that, as a general matter, the server(s) 400 may execute any technically feasible types of application(s), such as the design applications described above.

As shown, each of the client device(s) 404 includes input device(s) 426, the client application 422, a communication interface 420, and a display 424. The input device(s) 426 may include any type of device(s) for receiving user input, such as a keyboard, a mouse, a joystick, and/or a game controller. The client application 422 receives input data in response to user inputs at the input device(s) 426, transmits the input data to one of the server(s) 402 via the communication interface 420 (e.g., a network interface controller) and over the network(s) 406 (e.g., the Internet), receives encoded display data from the server 402, and decodes and causes the display data to be displayed on the display 424 (e.g., a cathode ray tube, liquid crystal display, light-emitting diode display, or the like). As such, more computationally intense computing and processing can be offloaded to the server(s) 402. For example, a game session could be streamed to the client device(s) 404 from the server(s) 402, thereby reducing the requirements of the client device(s) 404 for graphics processing and rendering.

As shown, each of the server(s) 402 includes a communication interface 418, CPU(s) 408, a parallel processing subsystem 410, a rendering component 412, a render capture component 414, and an encoder 416. Input data transmitted by the client device 404 to one of the server(s) 402 is received via the communication interface 418 (e.g., a network interface controller) and processed via the CPU(s) 408 and/or the parallel processing subsystem 410 included in that server 402, which correspond to the CPU 102 and the parallel processing subsystem 112, respectively, of the computer system 100 described above in conjunction with FIGS. 1-3. In some embodiments, the CPU(s) 408 may receive the input data, process the input data, and transmit data to the parallel processing subsystem 410. In turn, the parallel processing subsystem 410 renders one or more standalone images and/or image frames, such as the frames of a video game, based on the transmitted data.

Illustratively, the rendering component 412 employs the parallel processing subsystem 112 to render the result of processing the input data, and the render capture component 414 captures the rendering as display data (e.g., as image data capturing standalone image(s) and/or image frame(s)). The rendering performed by the rendering component 412 may include ray- or path-traced lighting and/or shadow effects, computed using one or more parallel processing units—such as GPUs, which may further employ the use of one or more dedicated hardware accelerators or processing cores to perform ray or path-tracing techniques—of the server 402. In some embodiments, the rendering component 412 performs rendering using the ray cone tracing techniques disclosed herein. Thereafter, the encoder 416 encodes display data capturing the rendering to generate encoded display data that is transmitted, over the network(s) 406 via the communication interface 418, to the client device(s) 422 for display to user(s). In some embodiments, the rendering component 412, the render capture component 414, and the encoder 416 may be included in the rendering application 130, described above in conjunction with FIG. 1.

Returning to the example of cloud gaming, during a game session, input data that is received by one of the server(s) 402 may be representative of movement of a character of the user in a game, firing a weapon, reloading, passing a ball, turning a vehicle, etc. In such a case, the rendering component 412 may generate a rendering of the game session that is representative of the result of the input data, and the render capture component 414 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the ray cone tracing techniques disclosed herein. The rendered game session may then be encoded, by the encoder 416, to generate encoded display data that is transmitted over the network(s) 406 to one of the client device(s) 404 for decoding and output via the display 424 of that client device 404.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Ray Cone Tracing and Texture Filtering Techniques

Figure 5:
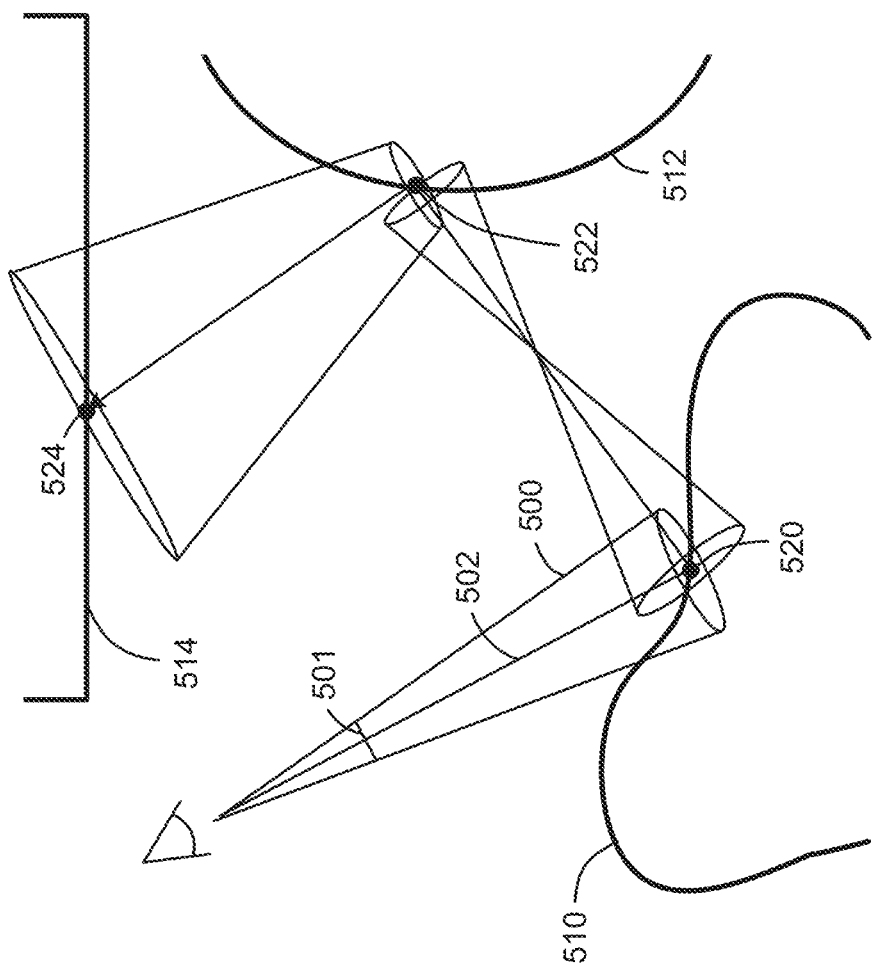
FIG. 5 illustrates an exemplar ray cone being traced through a virtual three-dimensional scene, according to various embodiments.

FIG. 5 illustrates an exemplar ray cone being traced through a virtual three-dimensional scene, according to various embodiments. As shown, a ray cone 500, which is an augmentation to a ray 502, is traced through a pixel 501 in a screen space into a scene that includes three objects 510, 512, and 514. When the ray cone 500 hits one of the objects 510, 512, 514, the ray cone 500 can reflect off in a direction, depending on material properties of the object. In addition, an angle of the ray cone 502 can grow or shrink (or stay the same) based on a surface curvature of the object. In general, the angle of the ray cone 500 grows if the surface curvature at a hit point where the ray 502 intersects geometry of the object is convex, and vice versa.

Illustratively, an angle of the ray cone 500 shrinks after hitting the object 510, because the surface curvature at the hit point 520 is negative. After shrinking to zero size, the ray cone 500 grows again in size. Then, the angle of ray cone 500 grows after hitting the object 512 at a hit point 522, because the surface curvature at the hit point 522 is convex.

In some embodiments, the rendering application 130 instructs a texture unit of a GPU (e.g., the texture unit 315 described above in conjunction with FIG. 3) to perform anisotropic texture filtering at a hit point (e.g., the hit point 520, 522, or 524) based on the texture of a surface at that hit point and a texture footprint that is determined by approximating the ray cone 500 as a cylinder. For example, assume the leftmost object 510 has a marble surface that is textured and reflective, the object 512 has a wooden surface that is also textured and reflective, and the object 514 has a surface that is textured but not reflective. In such a case, the rendering application could trace the ray cone 500 to the hit point 520 on the object 510, perform an anisotropic texture filtering lookup based on a corresponding texture footprint and a texture of the marble surface of the object 510, trace a reflected ray cone to the hit point 522 on the object 512, perform another anisotropic texture filtering lookup based on a corresponding texture footprint and a texture of the wooden surface of the object 512, trace yet another reflected ray cone to the hit point 524 on the object 514, and perform yet another anisotropic texture filtering lookup based on a corresponding texture footprint and a texture of the surface of the object 514. Results of the anisotropic texture filtering lookups can then be used to render, on the surface of the object 510, a combination of the marble texture associated with the object 510 and textured reflections from the wooded and other textures associated with the objects 512 and 514, respectively.

Figure 6:
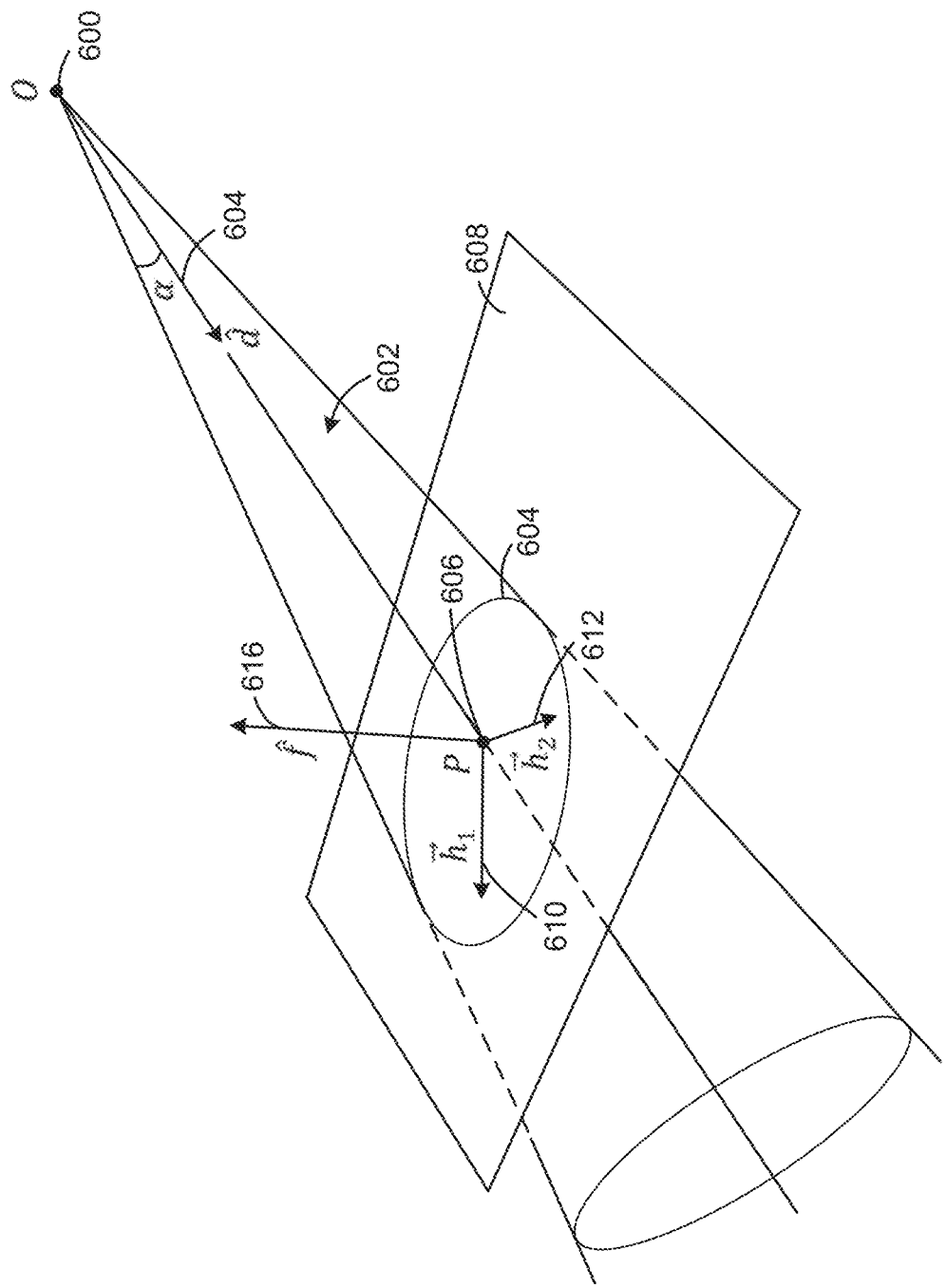
FIG. 6 illustrates an approach for performing anisotropic texture filtering using ray cones, according to various embodiments.

FIG. 6 illustrates an approach for performing anisotropic texture filtering using ray cones, according to various embodiments. As shown, the intersection of a ray cone 602 with a triangle plane 608, which is a plane passing through vertices of a triangle at a hit point 606 where the ray cone 602 intersects geometry (including the triangle) within a 3D virtual scene, forms an ellipse 604. The ellipse 604 corresponds to a texture footprint that can be used to perform anisotropic texture filtering. In particular, major and minor axes (not shown) of the ellipse 604 can be input into a hard-accelerated texture lookup unit in a GPU that performs anisotropic texture filtering based on those axes.

More formally, let d be the direction associated with the ray cone 602. As used herein, a hat denotes a normalized vector, and capitalization denotes a point. Projecting d onto the triangle plane 608 that is defined by a normal vector 616, denoted by $\hat{f}$, gives one axis 610 of the ellipse 604 that is denoted by $\vec{h}_1$. Another axis 612 of the ellipse 604, denoted by $\vec{h}_2$, can be computed as $\vec{h}_2 = \hat{f} \times \vec{h}_1$. The axes 610 and 612 can then be rescaled to fit a size of the ellipse 604, giving the major and minor axes of the ellipse 604 that are denoted herein by $\vec{a}_1$ and $\vec{a}_2$, respectively.

Figure 7:
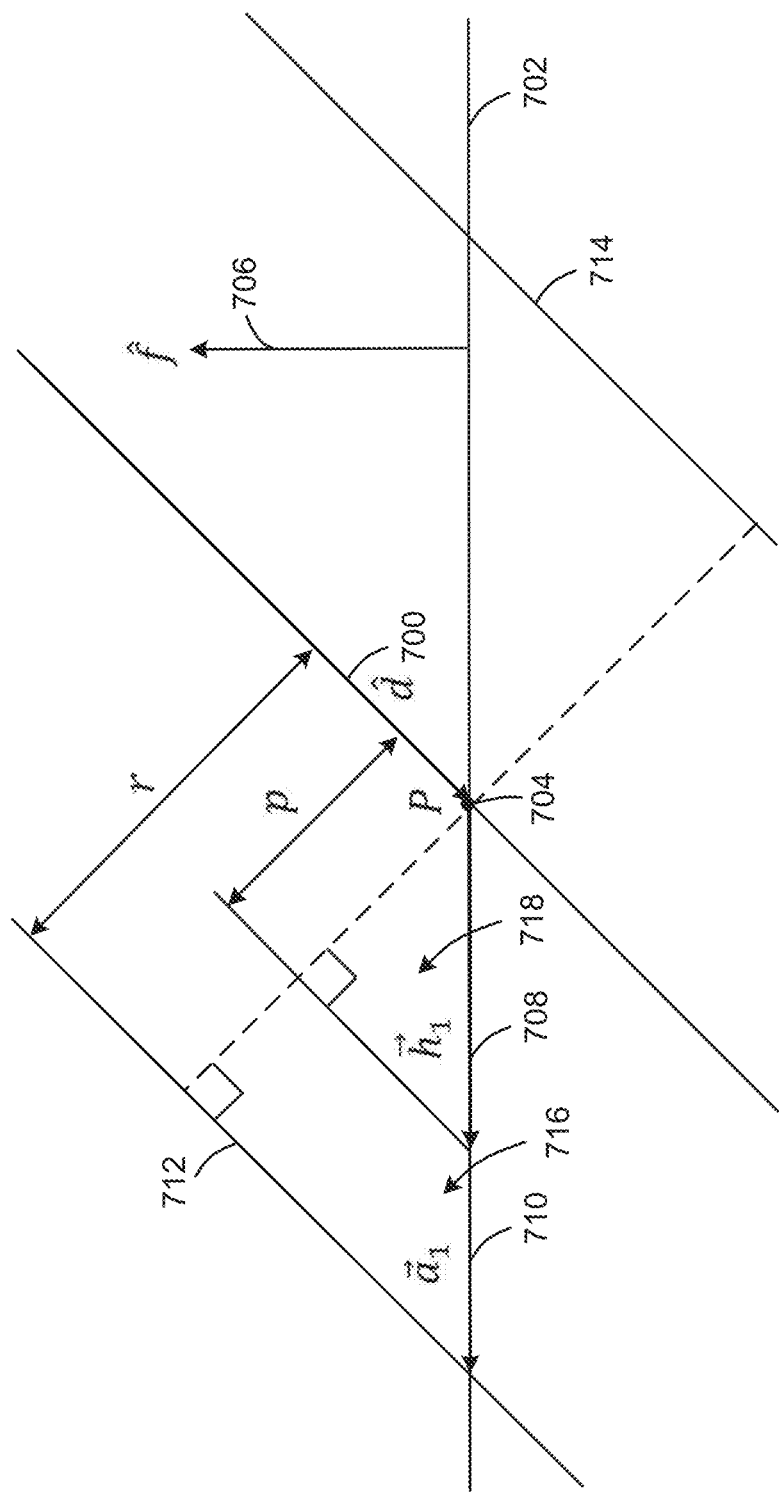
FIG. 7 illustrates the side view of a cylinder approximation of a ray cone, according to various embodiments.

In some embodiments, the computational complexity of obtaining the axes $\vec{a}_1$ and $\vec{a}_2$ of the ellipse 604 is reduced by approximating the ray cone 602 as a cylinder oriented along the cone direction $\hat{d}$. FIG. 7 illustrates the side view of a cylinder approximation of a ray cone, according to various embodiments. As shown, a ray cone can be approximated as a cylinder having sides 712 and 714 that are oriented along the ray cone direction $\hat{d}$. Such a cylinder has a width equal to the ray cone width at a hit point on a triangle plane 702 with normal vector 706, $\hat{f}$. For primary hit points, the ray cone width can be calculated as w=2r=2t tan α, where t is a distance to the hit point and α is an angle of the hit cone. The radius r is then r=t tan α. In addition, as described above in conjunction with FIG. 5, a direction 708, $\vec{h}_1$, of the major axis 710, $\vec{a}_1$, of the ellipse can be determined by projecting the ray cone direction $\hat{d}$ onto the triangle plane 702 defined by its normal 706, $\hat{f}$, according to equation (1):

$$\vec{h}_1 = \vec{d} - (\hat{f} \cdot \vec{d})\hat{f}. \tag{1}$$

In some embodiments, similar triangles, shown as triangles 718 and 718, are used to determine a length of the major axis 710, $\hat{a}_1$. In such cases, a ratio between the length of the major axis 710, $\vec{a}_1$, and the length of the projected vector 708, $\vec{h}_1$, can be expressed as:

$$\frac{\|\vec{a}_1\|}{\|\vec{h}_1\|} = \frac{r}{p}, \tag{2}$$

where $\vec{a}_1$ is parallel to $\vec{h}_1$ but has the correct length of the major axis 710 and p is a length of the projection of $\vec{h}_1$ onto the plane whose normal is $\hat{d}$, i.e., $p = \|\vec{h}_1 - (\hat{d} \cdot \vec{h}_1)\hat{d}\|$. From equation (2), the scaled major axis 710, $\vec{a}_1$, can be computed as:

$$\vec{a}_1 = \frac{r}{p}\vec{h}_1 = \frac{r}{\|\vec{h}_1 - (\hat{d} \cdot \vec{h}_1)\hat{d}\|}\vec{h}_1. \tag{3}$$

In addition, the minor axis, $\vec{a}_2$, can be determined by taking a cross product between the major axis and the normal and rescaling using the same technique, i.e., $$\vec{h}_2 = \hat{f} \times \vec{h}_1, \vec{a}_2 = \frac{r}{\|\vec{h}_2 - (\hat{d} \cdot \vec{h}_2)\hat{d}\|}\vec{h}_2. \tag{4}$$

It should be noted that when the ray cone direction 700, $\hat{d}$, is parallel to the plane normal 706, $\hat{f}$, then the scale of the axes becomes zero. To prevent dividing by zero, the computed axes lengths can be clamped to a small constant so that the axes lengths are never less than the small constant. Such a clamping can also be used to handle the case when the ray direction 700, $\hat{d}$, is perpendicular to the plane normal 706, $\hat{f}$.

After determining the major and minor axes $\vec{a}_1$ and $\vec{a}_2$ of the ellipse formed by the intersection of the ray cone with the triangle plane at a hit point, the rendering application 130 computes gradients of texturing coordinates along those axes in texture space and feeds the gradients, along with a texture, to the texture unit of a GPU (e.g., the texture unit 315 described above in conjunction with FIG. 3) that performs anisotropic texture filtering based on the gradients and the texture. Any technically feasible anisotropic texture filtering may be performed in embodiments. For example, in the case of HLSL, which is the High Level Shading Language for DirectX, the SampleGrad function can be called to sample a texture, with the gradients being used to influence the sampling. In such a case, the sampling can include, e.g., performing multiple bi-linear lookups within an ellipse indicated by the gradients and averaging results of those lookups to obtain an anisotropic filtered texture value.

Figure 8:
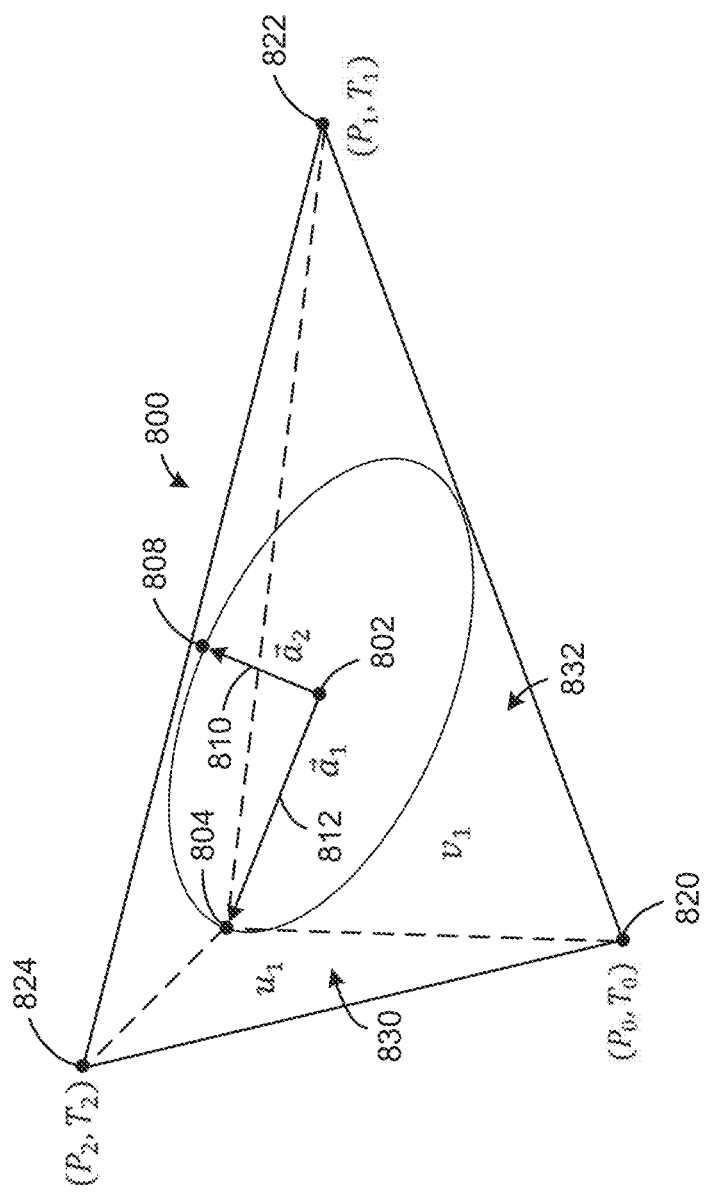
FIG. 8 illustrates an approach for determining gradients of texturing coordinates along the axes of an ellipse, according to various embodiments.

FIG. 8 illustrates an approach for determining gradients of texturing coordinates along the axes of an ellipse, according to various embodiments. As shown, a triangle includes vertices 820, 822, and 824 at positions $P_0$, $P_1$, and $P_2$ and having texture coordinates $T_0$, $T_1$, and $T_2$, respectively, where a texture coordinate $T_i=(t_{ix}, t_{iy})$. Texture coordinates are two-dimensional coordinates that are assigned to the vertices of a triangle and indicate how a texture can be mapped onto the triangle. An elliptic footprint is also shown with center point 802, denoted by P, and barycentric coordinates (u, v). Barycentric coordinates are different from texture coordinates and can be used to interpolate colors within a triangle. Although an ellipse within the triangle having vertices 820, 822, and 824 is shown for illustrative purposes, it should be understood that the ellipse can also be at least partially outside of the triangle. In such cases, the barycentric coordinates would be negative outside of the triangle.

To compute a gradient $\vec{g}_1$ along the major axis $\vec{a}_1$, the first step is to compute barycentric coordinates, $(u_1, v_1)$, at a point 804 on the ellipse, which can be found by adding the major axis vector 812, $\vec{a}_1$, to the hit point 802, P, i.e., the point 804 is $P+\vec{a}_1$. Although described with respect to the gradient $\vec{g}_1$ along the major axis 812, $\vec{a}_1$, for illustrative purposes, a gradient $\vec{g}_2$ along the minor axis $\vec{a}_2$ can be computed in an analogous manner using $\vec{a}_2$. The barycentric coordinate $u_1$ at the point 804 can be computed as the area of the triangle 830 divided by the entire area of the triangle having vertices 820, 822, and 824:

$$u_1 = \frac{\hat{f} \cdot (\vec{e}_P \times \vec{e}_2)}{\hat{f} \cdot (\vec{e}_1 \times \vec{e}_2)}, \tag{5}$$

where $\vec{e}_1=P_1-P_0$, $\vec{e}_2=P_2-P_0$, $\vec{e}_P=P+\vec{a}_1-P_0$, and $\hat{f}$ is the normalized triangle normal. The numerator in equation (5) is $\hat{f} \cdot (\vec{e}_P \times \vec{e}_2) = \|\vec{e}_P \times \vec{e}_2\|$, which is twice the area of the triangle 830 because $\hat{f}$ is normalized and perpendicular to $\vec{e}_P$ and $\vec{e}_2$. The denominator in equation (5) is the area of the triangle spanned by $P_0$, $P_1$, and $P_2$. Similarly, the other barycentric coordinate, $v_1$, can be computed by dividing an area of triangle 832 by the entire triangle area, according to equation (6):

$$v_1 = \frac{\hat{f} \cdot (\vec{e}_1 \times \vec{e}_P)}{\hat{f} \cdot (\vec{e}_1 \times \vec{e}_2)}. \tag{6}$$

In other embodiments, barycentric coordinates can be computed in any technically feasible manner, including using techniques that are well-known to persons skilled in the art.

Using the barycentric coordinates $(u_1, v_1)$ at the point 804 and the barycentric coordinates (u, v) at the hit point 802, texture coordinate gradients for the axes of the ellipse 812, $\vec{a}_1$, and 810, $\vec{a}_2$, can be computed. In particular, because texture coordinates can be interpolated as $T(u, v)=(1-u-v)T_0+uT_1+vT_2$, the gradients can be computed as differences between the texture coordinates at the points 804 and 808 on the ellipse and the texture coordinates at the hit point 802:

$$\hat{g}_1=T(u_1,v_1)-T(u,v), \vec{g}_2=T(u_2,v_2)-T(u,v), \tag{7}$$

where, as previously noted, $(u_2, v_2)$ can be computed analogously to $(u_1, v_1)$, but based on $\vec{a}_2$.

As described, the gradients computed according to equation (7) can be input, along with a texture, into the texture unit of a GPU that performs anisotropic texture filtering based on the gradients and the texture. For example, the SampleGrad function in HLSL can be called to sample the texture using the gradients.

In some embodiments, the approach for performing anisotropic filtering using ray cones described above in conjunction with FIGS. 4-7 can be implemented according to the following pseudocode:

```
// P is the intersection point
// f is the triangle normal
// d is the ray cone direction
void computeAnisotropicEllipseAxes(in float3 P, in float3 f, in float3 d, in float
rayConeRadiusAtIntersection, in float3 positions[3], in float2 txcoords[3], in float2
interpolatedTexCoordsAtIntersection, out float2 texGradient1, out float2 texGradient2)
{
    // Compute ellipse axes.
    float3 a1 = d - dot(f, d) *f;
    float3 p1 = a1 - dot(d, a1) * d;
    a1 *= rayConeRadiusAtIntersection / max(0.0001, length(p1));
    float3 a2 = cross(f, a1);
    float3 p2 = a2 - dot(d, a2) * d;
    a2 *= rayConeRadiusAtIntersection / max(0.0001, length(p2));
    // Compute texture coordinate gradients.
    float3 eP, delta = P - positions[0];
    float3 e1 = positions[1] - positions[0];
    float3 e2 = positions[2] - positions[0];
    float oneOverAreaTriangle = 1.0 / dot(f, cross(e1, e2));
    eP = delta + a1;
    float u1 = dot(f, cross(eP, e2)) * oneOverAreaTriangle;
    float v1 = dot(f, cross(e1, eP)) * oneOverAreaTriangle;
```

```
    texGradient1 = (1.0-u1-v1) *txcoords[0] + u1 *txcoords[1] +
    v1 * txcoords[2] - interpolatedTexCoordsAtIntersection;
    eP = delta + a2;
    float u2 = dot(f, cross(eP, e2)) * oneOverAreaTriangle;
    float v2 = dot(f, cross(e1, eP)) * oneOverAreaTriangle;
    texGradient2 = (1.0-u2-v2) * txcoords[0] + u2 * txcoords[1] +
    v2 * txcoords[2] - interpolatedTexCoordsAtIntersection;
}
```

Figure 9B:
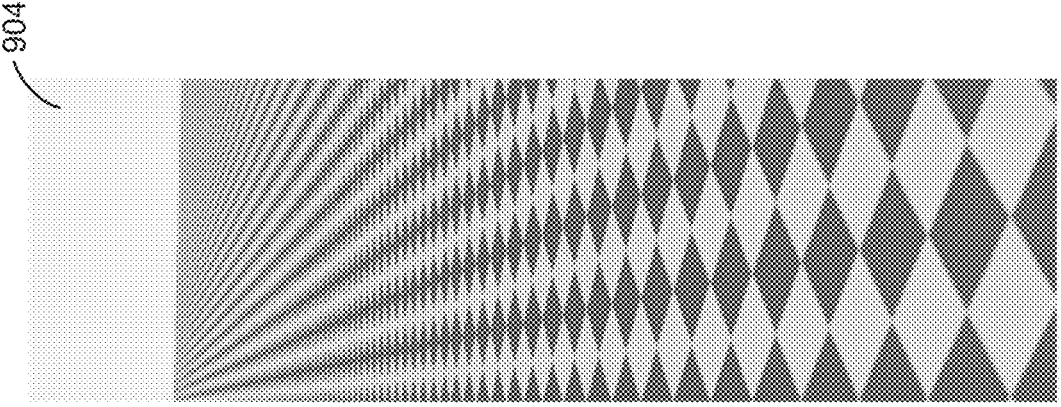
FIG. 9B illustrates an exemplar image rendered using ray cone tracing that implements anisotropic filtering, according to various embodiments.
Figure 9A:
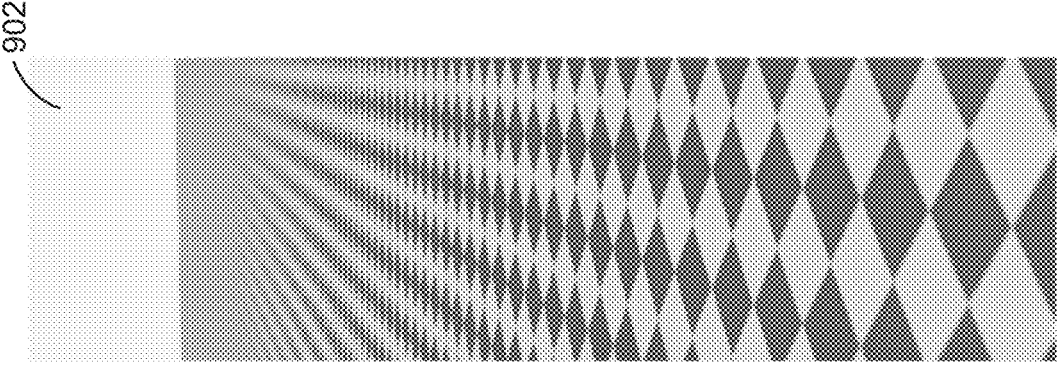
FIG. 9A illustrates an exemplar image rendered using ray cone tracing that does not implement anisotropic filtering, according to the prior art.

FIG. 9A illustrates an exemplar image rendered using ray cone tracing that does not implement anisotropic filtering, according to the prior art. As shown, an image 902 that is rendered using ray cone tracing, but without anisotropic filtering, includes a planar surface having a checkerboard pattern texture. In the rendered image 902, the checkerboard pattern becomes gray and blurry at extreme grazing angles.

FIG. 9B illustrates an exemplar image rendered using ray cone tracing that implements anisotropic filtering, according to various embodiments. As shown, an image 904 that is rendered using ray cone tracing, and with anisotropic filtering, includes the same planar surface having a checkerboard pattern texture that is included in the rendered image 902. Illustratively, the rendered image 904 is crisper than the rendered image 902, with less blurriness at extreme grazing angles.

Referring generally to FIGS. 5-9B, persons skilled in the art will understand that the foregoing examples are presented for clarity and not meant to limit the scope of the present embodiments. As a general matter, any technically feasible approach to modifying or permuting graphics objects can be applied, and any technically feasible approach to detecting modified or permuted graphics objects can equally be applied.

Figure 10:
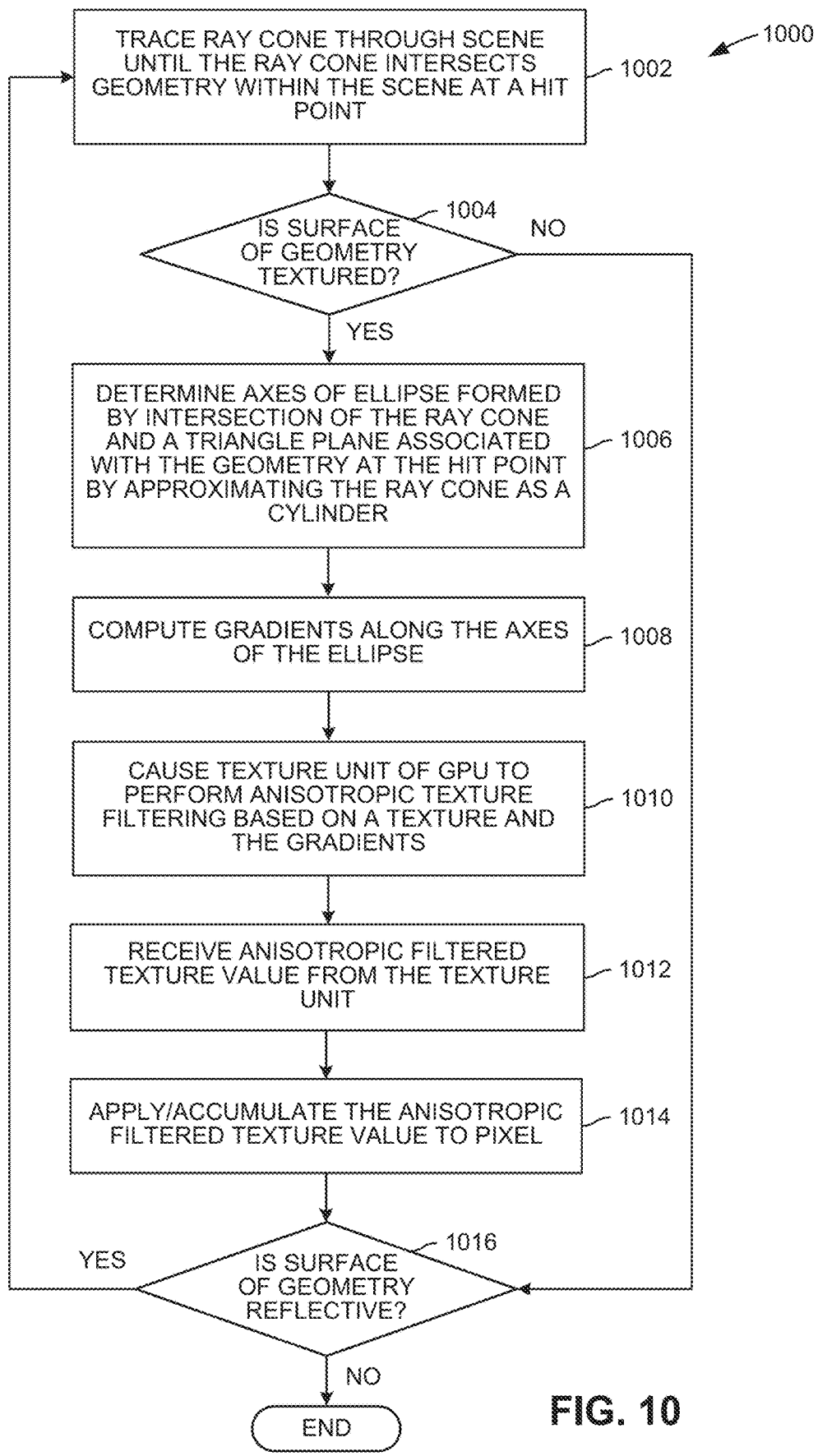
FIG. 10 is a flow diagram of method steps for computing a pixel color using a ray cone tracing technique that implements anisotropic filtering, according to various embodiments.

FIG. 10 is a flow diagram of method steps for computing a pixel color using a ray cone tracing technique that implements anisotropic filtering, according to various embodiments. Although the method steps are described in conjunction with the systems of FIGS. 1-4, persons skilled in the art will understand that any system configured to perform the method steps in any order falls within the scope of the present embodiments. Although described with respect to tracing a single ray cone, the method steps can be repeated to trace multiple ray cones when rendering an image.

As shown, a method 1000 begins at step 1002, where the rendering application 130 traces a ray cone through a scene until the ray cone intersects geometry within the scene at a hit point. In particular, the ray cone can be traced through a pixel in a screen space into the scene until the ray cone intersects a triangle in the geometry at the hit point.

At step 1004, if the surface of the geometry at the hit point is textured, then, at step 1006, the rendering application 130 determines the axes of an ellipse formed by an intersection of the ray cone and a triangle plane associated with the geometry at the hit point by approximating the ray cone as a cylinder. As described, in some embodiments, the rendering application 130 can determine a major axis of the ellipse by projecting a direction vector associated with the ray cone onto the triangle plane to obtain a vector associated with the major axis, and using similar triangles to rescale that vector to a correct size of the major axis, according to equation (3). Similarly, the rendering application 130 can determine a minor axis of the ellipse by taking a cross product between the major axis vector and a normal of the triangle plane to obtain a vector associated with the minor axis, and rescaling that vector using similar triangles, according to equation (4).

At step 1008, the rendering application 130 computes gradients along the axes of the ellipse. As described, in some embodiments, the rendering application 130 first computes barycentric coordinates on the ellipse by dividing the areas of sub-triangles (e.g., the triangles 830 and 832) within the triangle at the hit point by an area of the entire triangle (e.g., the triangle having vertices 820, 822, and 824). The rendering application 130 then computes texture coordinates based on the barycentric coordinates, and uses the texture coordinates to compute gradients along axes of the ellipse as differences between the texture coordinates at points along the axes on the ellipse and texture coordinates at the hit point, according to equation (7).

At step 1010, the rendering application 130 causes the texture unit of a GPU to perform anisotropic texture filtering based on a texture and the gradients. As described, any technically feasible anisotropic texture filtering may be performed in embodiments. For example, the rendering application 130 can include a call to the SampleGrad function in HLSL to sample the texture, with the gradients being used to influence the sampling. In addition, the sampling can include, e.g., performing circular mipmap lookups within an ellipse indicated by the gradients and averaging results of those mipmap lookups to obtain an anisotropic filtered texture value.

At step 1012, the rendering application 130 receives an anisotropic filtered texture value from the texture unit of the GPU, after the texture unit has performed anisotropic texture filtering based on the texture and the gradients. The anisotropic filtered texture value represents a texture color associated with the pixel in the screen space through which the ray cone was traced at step 1002.

At step 1014, the rendering application 130 applies or accumulates the anisotropic filtered texture value to the pixel through which the ray cone was traced at step 1002. The applied or accumulated texture filter value contributes to the color of the pixel in a rendered image. As described, the rendered image can be, e.g., an image or frame within a video game or film, an image generated by an architectural or design application or any other application, or the like.

Although described herein with respect to applying or accumulating the anisotropic filtered texture value to the pixel, in other embodiments, the anisotropic filtered texture value may be used in any technically feasible manner.

At step 1016, if the surface of the geometry at the hit point is not reflective, then the method 1000 ends. On the other hand, if the surface of the geometry at the hit point is reflect, then the method 1000 returns to step 1002, where the rendering application 130 traces a (reflected) ray cone through the scene, until the (reflected) ray cone intersects geometry within the scene again at another hit point.

In sum, the disclosed techniques implement anisotropic texture filtering using ray cones. When a ray cone being traced through a virtual 3D scene hits a surface within the scene at a hit point, the ray cone is approximated as a cylinder to determine the axes of an ellipse formed by the intersection of the ray cone with a triangle plane at the hit point. Texture coordinate gradients along the axes of the ellipse are computed and input, along with a texture, into the texture unit of a graphics processing unit (GPU) that performs anisotropic texture filtering. The texture unit outputs an anisotropic filtered texture color that can then be used to determine the color of a pixel in a rendered image.

At least one technological advantage of the disclosed techniques relative to the prior art is that the disclosed techniques implement anisotropic filtering using ray cone tracing, thereby producing images that include fewer aliasing effects, less blurriness, and more detail at extreme angles relative to images rendered using conventional ray cone tracing. In addition, the disclosed techniques use ray cone tracing, which is less computationally expensive than some other ray tracing techniques, such as differential ray tracing, that can be used to implement anisotropic filtering. These technological advantages represent one or more technological improvements over prior art approaches.

1. In some embodiments, a computer-implemented method for rendering one or more graphics images comprises tracing one or more ray cones through a graphics scene, performing one or more anisotropic texture filtering operations based on the one or more ray cones to compute texture colors, and rendering one or more graphics images based on the texture colors.

2. The computer-implemented method of clause 1, wherein performing the one or more anisotropic texture filtering operations comprises, for each ray cone of the one or more ray cones determining at least one axis of an ellipse formed by the ray cone intersecting a plane associated with geometry within the graphics scene, computing one or more gradients along the at least one axis of the ellipse, and computing at least one texture color based on the one or more gradients and one or more textures.

3. The computer-implemented method of clauses 1 or 2, wherein determining the at least one axis of the ellipse comprises approximating the ray cone intersecting the plane as a cylinder.

4. The computer-implemented method of any of clauses 1-3, wherein the one or more graphics images are associated with a video game, a film, or an architectural or design application.

5. The computer-implemented method of any of clauses 1-4, wherein the steps of tracing, performing one or more anisotropic texture filtering operations, and rendering are performed in a virtualized environment.

6. The computer-implemented method of any of clauses 1-5, wherein the steps of tracing, performing one or more anisotropic texture filtering operations, and rendering are performed in a cloud computing environment.

7. In some embodiments, a computer-implemented method for computing a texture color comprises tracing a ray cone through a graphics scene, determining at least one axis of a first ellipse formed by the ray cone intersecting a first plane associated with geometry within the graphics scene at a first hit point, computing one or more gradients along the at least one axis of the first ellipse, and computing a first texture color based on the one or more gradients and a first texture.

8. The computer-implemented method of clause 7, wherein computing the first texture color comprises performing one or more anisotropic texture filtering operations based on the one or more gradients and the first texture.

9. The computer-implemented method of clauses 7 or 8, wherein determining the at least one axis of the first ellipse comprises approximating the ray cone intersecting the first plane as a cylinder.

10. The computer-implemented method of any of clauses 7-9, wherein determining the at least one axis of the first ellipse comprises projecting a direction vector associated with the ray cone onto the first plane to generate a first vector associated with a major axis, rescaling the first vector based on a first set of similar triangles, computing a cross product between the first vector and a normal vector associated with the first plane to generate a second vector associated with a minor axis, and rescaling the second vector based on a second set of similar triangles.

11. The computer-implemented method of any of clauses 7-10, wherein computing the one or more gradients along the at least one axis of the first ellipse comprises computing a plurality of barycentric coordinates on the first ellipse, computing a plurality of texture coordinates based on the plurality of barycentric coordinates, and computing the one or more gradients based on the plurality of texture coordinates.

12. The computer-implemented method of any of clauses 7-11, wherein computing the plurality of barycentric coordinates comprises dividing areas of a plurality of triangles within a first triangle by an area of the first triangle.

13. The computer-implemented method of any of clauses 7-12, wherein the plurality of texture coordinates are computed at a plurality of points that are along the at least one axis and on the ellipse and at the first hit point, and computing the one or more gradients comprises subtracting the texture coordinates at the first hit point from the texture coordinates at the plurality of points that are along the at least one axis and on the first ellipse.

14. The computer-implemented method of any of clauses 7-13, further comprising clamping one or more lengths of the at least one axis of the first ellipse to a constant value.

15. The computer-implemented method of any of clauses 7-14, further comprising tracing a reflected ray cone through the graphics scene, determining at least one axis of a second ellipse formed by the reflected ray cone intersecting a second plane associated with additional geometry within the graphics scene at a second hit point, computing one or more gradients along the at least one axis of the second ellipse, and computing a second texture color based on the one or more gradients along the at least one axis of the second ellipse and a second texture.

16. In some embodiments, one or more non-transitory computer-readable media store program instructions that, when executed by at least one processor, cause the at least one processor to perform the steps of tracing a ray cone through a graphics scene, determining at least one axis of a first ellipse formed by the ray cone intersecting a first plane associated with geometry within the graphics scene at a first hit point, computing one or more gradients along the at least one axis of the first ellipse, and computing a first texture color based on the one or more gradients and a first texture.

17. The one or more non-transitory computer-readable media of clause 16, wherein computing the first texture color comprises performing one or more mipmap lookup operations based on the one or more gradients and the first texture.

18. The one or more non-transitory computer-readable media of clauses 16 or 17, wherein determining the at least one axis of the first ellipse comprises projecting a direction vector associated with the ray cone onto the first plane to generate a first vector associated with a major axis, rescaling the first vector based on a first set of similar triangles, computing a cross product between the first vector and a normal vector associated with the first plane to generate a second vector associated with a minor axis, and rescaling the second vector based on a second set of similar triangles.

19. The one or more non-transitory computer-readable media of any of clauses 16-18, wherein each of the one or more gradients comprises a texturing coordinates gradient.

20. The one or more non-transitory computer-readable media of any of clauses 16-19, wherein computing the one or more gradients along the at least one axis comprises subtracting texture coordinates at the first hit point from texture coordinates at a plurality of points that are along the at least one axis and on the first ellipse.

21. The one or more non-transitory computer-readable media of any of clauses 16-20, wherein computing the one or more gradients along the at least one axis of the first ellipse comprises computing a plurality of barycentric coordinates on the first ellipse, computing a plurality of texture coordinates based on the plurality of barycentric coordinates, and computing the one or more gradients based on the plurality of texture coordinates.

22. The one or more non-transitory computer-readable media of any of clauses 16-21, the steps further comprising tracing a reflected ray cone through the graphics scene, determining at least one axis of a second ellipse formed by the reflected ray cone intersecting a second plane associated with additional geometry within the graphics scene at a second hit point, computing one or more gradients along the at least one axis of the second ellipse, and computing a second texture color based on the one or more gradients along the at least one axis of the second ellipse and a second texture.

23. In some embodiments, a system comprises one or more memories storing instructions, and one or more processors that are coupled to the one or more memories and, when executing the instructions, are configured to trace a ray cone through a graphics scene, determine at least one axis of an ellipse formed by the ray cone intersecting a plane associated with geometry within the graphics scene at a hit point, compute one or more gradients along the at least one axis of the ellipse, and compute a texture color based on the one or more gradients and a texture.

24. The system of clause 23, wherein the one or more processors includes at least one of a graphics processing unit (GPU) or a virtual GPU, and computing the texture color comprises performing, via a texture unit included in the at least one of the GPU or the virtual GPU, one or more anisotropic texture filtering operations based on the one or more gradients and the texture.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more graphics images, the method comprising:
   tracing one or more ray cones through a graphics scene;
   performing one or more anisotropic texture filtering operations to compute texture colors based on one or more cylinders that approximate the one or more ray cones that have been traced; and
   rendering one or more graphics images based on the texture colors.

2. The computer-implemented method of claim 1, wherein performing the one or more anisotropic texture filtering operations comprises, for each ray cone of the one or more ray cones:
   determining at least one axis of an ellipse formed by the ray cone approximated as a cylinder intersecting a plane associated with geometry within the graphics scene;
   computing one or more gradients along the at least one axis of the ellipse; and
   computing at least one texture color based on the one or more gradients and one or more textures.

3. The computer-implemented method of claim 1, wherein the one or more graphics images are associated with a video game, a film, or an architectural or design application.

4. The computer-implemented method of claim 1, wherein the steps of tracing, performing one or more anisotropic texture filtering operations, and rendering are performed in a virtualized environment.

5. The computer-implemented method of claim 1, wherein the steps of tracing, performing one or more anisotropic texture filtering operations, and rendering are performed in a cloud computing environment.

6. A computer-implemented method for computing a texture color, the method comprising:
   tracing a ray cone through a graphics scene;
   determining at least one axis of a first ellipse formed by the ray cone intersecting a first plane associated with geometry within the graphics scene at a first hit point;
   computing one or more gradients along the at least one axis of the first ellipse; and
   computing a first texture color based on the one or more gradients and a first texture.

7. The computer-implemented method of claim 6, wherein computing the first texture color comprises performing one or more anisotropic texture filtering operations based on the one or more gradients and the first texture.

8. The computer-implemented method of claim 6, wherein determining the at least one axis of the first ellipse comprises approximating the ray cone intersecting the first plane as a cylinder.

9. The computer-implemented method of claim 6, wherein determining the at least one axis of the first ellipse comprises:
   projecting a direction vector associated with the ray cone onto the first plane to generate a first vector associated with a major axis;
   rescaling the first vector based on a first set of similar triangles;
   computing a cross product between the first vector and a normal vector associated with the first plane to generate a second vector associated with a minor axis; and
   rescaling the second vector based on a second set of similar triangles.

10. The computer-implemented method of claim 6, wherein computing the one or more gradients along the at least one axis of the first ellipse comprises:
    computing a plurality of barycentric coordinates on the first ellipse;
    computing a plurality of texture coordinates based on the plurality of barycentric coordinates; and
    computing the one or more gradients based on the plurality of texture coordinates.

11. The computer-implemented method of claim 10, wherein computing the plurality of barycentric coordinates comprises dividing areas of a plurality of triangles within a first triangle by an area of the first triangle.

12. The computer-implemented method of claim 10, wherein the plurality of texture coordinates are computed at a plurality of points that are along the at least one axis and on the ellipse and at the first hit point, and computing the one or more gradients comprises subtracting the texture coordinates at the first hit point from the texture coordinates at the plurality of points that are along the at least one axis and on the first ellipse.

13. The computer-implemented method of claim 6, further comprising clamping one or more lengths of the at least one axis of the first ellipse to a constant value.

14. The computer-implemented method of claim 6, further comprising:
    tracing a reflected ray cone through the graphics scene;
    determining at least one axis of a second ellipse formed by the reflected ray cone intersecting a second plane associated with additional geometry within the graphics scene at a second hit point;
    computing one or more gradients along the at least one axis of the second ellipse; and
    computing a second texture color based on the one or more gradients along the at least one axis of the second ellipse and a second texture.

15. One or more non-transitory computer-readable media storing program instructions that, when executed by at least one processor, cause the at least one processor to perform the steps of:
    tracing a ray cone through a graphics scene;
    determining at least one axis of a first ellipse formed by the ray cone intersecting a first plane associated with geometry within the graphics scene at a first hit point;
    computing one or more gradients along the at least one axis of the first ellipse; and
    computing a first texture color based on the one or more gradients and a first texture.

16. The one or more non-transitory computer-readable media of claim 15, wherein computing the first texture color comprises performing one or more mipmap lookup operations based on the one or more gradients and the first texture.

17. The one or more non-transitory computer-readable media of claim 15, wherein determining the at least one axis of the first ellipse comprises:
    projecting a direction vector associated with the ray cone onto the first plane to generate a first vector associated with a major axis;
    rescaling the first vector based on a first set of similar triangles;
    computing a cross product between the first vector and a normal vector associated with the first plane to generate a second vector associated with a minor axis; and
    rescaling the second vector based on a second set of similar triangles.

18. The one or more non-transitory computer-readable media of claim 15, wherein each of the one or more gradients comprises a texturing coordinates gradient.

19. The one or more non-transitory computer-readable media of claim 15, wherein computing the one or more gradients along the at least one axis comprises subtracting texture coordinates at the first hit point from texture coordinates at a plurality of points that are along the at least one axis and on the first ellipse.

20. The one or more non-transitory computer-readable media of claim 15, wherein computing the one or more gradients along the at least one axis of the first ellipse comprises:
computing a plurality of barycentric coordinates on the first ellipse;
computing a plurality of texture coordinates based on the plurality of barycentric coordinates; and
computing the one or more gradients based on the plurality of texture coordinates.

21. The one or more non-transitory computer-readable media of claim 15, the steps further comprising:
tracing a reflected ray cone through the graphics scene;
determining at least one axis of a second ellipse formed by the reflected ray cone intersecting a second plane associated with additional geometry within the graphics scene at a second hit point;
computing one or more gradients along the at least one axis of the second ellipse; and
computing a second texture color based on the one or more gradients along the at least one axis of the second ellipse and a second texture.

22. A system, comprising:
one or more memories storing instructions; and
one or more processors that are coupled to the one or more memories and,
when executing the instructions, are configured to:
trace a ray cone through a graphics scene,
determine at least one axis of an ellipse formed by the ray cone intersecting a plane associated with geometry within the graphics scene at a hit point,
compute one or more gradients along the at least one axis of the ellipse, and
compute a texture color based on the one or more gradients and a texture.

23. The system of claim 22, wherein the one or more processors includes at least one of a graphics processing unit (GPU) or a virtual GPU, and computing the texture color comprises performing, via a texture unit included in the at least one of the GPU or the virtual GPU, one or more anisotropic texture filtering operations based on the one or more gradients and the texture.

* * * * *